Patented July 7, 1936

2,046,946

UNITED STATES PATENT OFFICE 2,046,946

PROCESS FOR THE PRODUCTION OF DI-AMINOALCOHOLS OF THE AROMATIC SERIES

Gustav Heilner, Berlin-Fichtengrund, Post Friedrichsthal, Germany, assignor to Chemische Fabriken Dr. Joachim Wiernik & Co. Aktiengesellschaft, Berlin-Waidmannslust, Germany No Drawing. Application January 9, 1934, Serial No. 705,969. In Germany January 12, 1933

13 Claims. (Cl. 260—128.5)

The present invention relates to a process for the production of diaminoalcohols of the aromatic series, of the type:

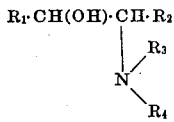

in which $R_1$ is an aromatic radicle, $R_2$ hydrogen or methyl, $R_3$ a dialkylaminoalkyl radicle and $R_4$ hydrogen or a hydrocarbon radicle.

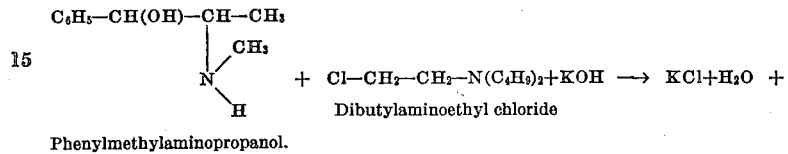 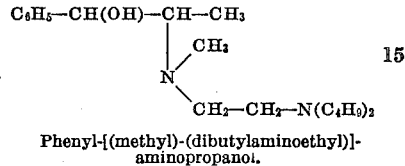

Phenylmethylaminopropanol.    Dibutylaminoethyl chloride    Phenyl-[(methyl)-(dibutylaminoethyl)]-aminopropanol.

For the purpose of producing these diamino alcohols, a second basic group is introduced into monoamino alcohols of the type:

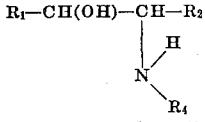

using for this purpose, the dialkylaminoalkyl halide or the dialkylaminoalkyl-sulphonic ester, e. g.

As is evident from the equation, 2 molecules of the aliphatic-aromatic amino-alcohol must be employed for the reaction, one molecule being converted into the diamino-alcohol, whilst the other is used to combine with hydrochloric acid formed in the reaction. If it be desired to convert the fatty-aromatic amino-alcohol completely into the diamino-alcohol, the reaction is performed in presence of an agent that will combine with acid, for example, in accordance with the equation:—

Since the production of the free dialkylaminoalkyl-halide and dialkylaminoalkyl-sulphonic esters is attended with certain difficulties, they are preferably employed in the form of their salts. In such case, it is necessary in causing these salts to react with aliphatic-aromatic alcohols, to increase the amount of the acid-fixing agent to such an extent that 1 additional mole-

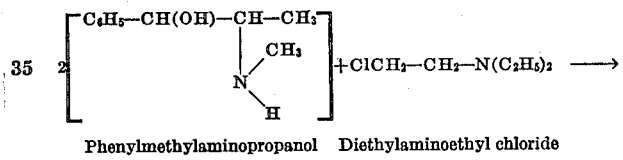

Phenylmethylaminopropanol    Diethylaminoethyl chloride

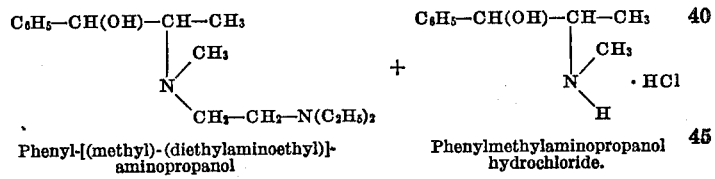

Phenyl-[(methyl)-(diethylaminoethyl)]-aminopropanol    Phenylmethylaminopropanol hydrochloride.

cule of acid can be released. The process may be illustrated by the following equation:—

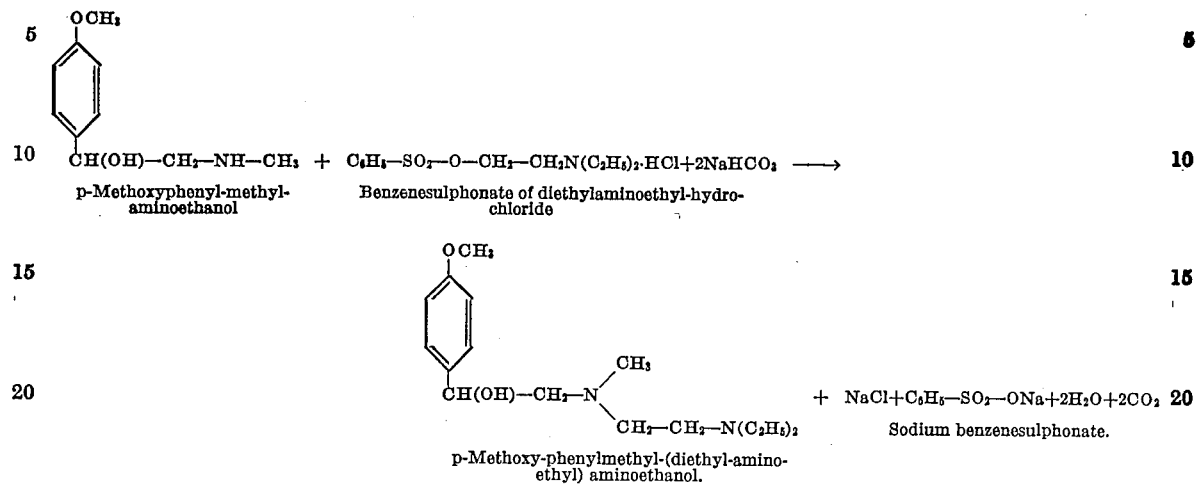

A further method of performing the process consists in effecting the conversion of both the aliphatic-aromatic amino alcohol and the dialkylaminoalkyl ester, in the form of their acid addition salts, in the presence of 3 equivalents of the acid-fixing agent, e. g.:

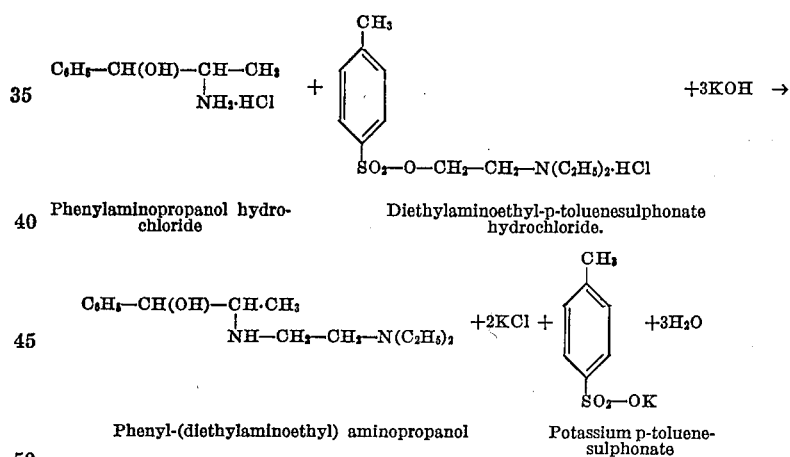

The diamino-alcohols prepared from derivatives of phenylamino-propanol in the above manner constitutes valuable medicaments for the treatment of asthma.

EXAMPLE 1

*l-1-phenyl-2-(methyl-(diethylaminoethyl))- aminopropane-1-ol*

A solution of 165 parts of l-1-phenyl-2-methyl-aminopropane-1-ol in 500 parts of benzene is treated with 68 parts of diethylaminoethyl chloride and warmed on the water bath. Phenylmethylaminopropanol chloride separates out. This is filtered off, the filtrate being freed from benzene in vacuo and the residue fractionated under a high vacuum. In this operation, a small quantity of phenylmethylaminopropanol, that has not taken part in the reaction, passes over in the first place followed by the new base in the form of a colorless oil.

This has a boiling point under 0.5 to 1 mm. pressure of about 140° C.

The 1-1-phenyl-2-methyl-(diethylamino-ethyl))-aminopropane-1-ol furnishes well-defined crystals of the dihydroiodide, having a melting point of 166–167° C., and a diprimary phosphate having a melting point of 167–168° C. The specific rotation of the dihydroiodide is $$\alpha \frac{20}{D} = -1.40$$

EXAMPLE 2

*d-1-phenyl-2-(methyl-(diethylaminoethyl))- aminopropane-1-ol*

50 grams of d-1-phenyl-2-methylaminopropane-1-ol and 17.2 grams of the hydrochloride of diethylaminoethyl chloride are heated at 110–120° C. for 8 hours, air being excluded. The reaction product is triturated with ether, the whole is rendered alkaline and the ethereal solution separated. After expulsion of the ether, the residue is distilled under a high vacuum, whereupon the d-1-phenyl-2-(methyl-(diethylaminoethyl))- aminopropane-1-ol passes over as a thick, colorless oil having a boiling point under 0.5–1 mm. pressure of about 140° C. The dihydrochloride of the base forms a hygroscopic crystalline mass.

EXAMPLE 3

*l-1-phenyl-2-(methyl-(dibutylaminoethyl))-aminopropane-1-ol*

16.5 grams of l-1-phenyl-2-methylaminopropane-1-ol and 19.2 grams of dibutylaminoethyl chloride are dissolved in 100 grams of benzene and a solution of 5.6 grams of potassium hydroxide in a three-fold quantity of water is dropped in, accompanied by stirring and heating under reflux. After heating for another hour, the layer of benzene is separated, the benzene is distilled off and the residue fractionated in vacuo. The 1-1-phenyl-2-(methyl-(dibutylaminoethyl))-aminopropane-1-ol boils at 170° C. under a vacuum of about 0.5 mm. The base forms a strongly hygroscopic, crystalline dihydrochloride.

EXAMPLE 4

*1-(p-methoxyphenyl)-2-(methyl-diethylaminoethyl)-aminoethane-1-ol*

181 grams of 1-(p-methoxyphenyl)-1-oxy-2-methylaminoethane, 293 grams of diethylaminoethylbenzenesulphonate hydrochloride, 168 grams of sodium bicarbonate, 1000 grams of benzene and 1000 grams of water are heated under reflux for several hours, assisted by stirring. The benzene layer is then separated, the benzene being distilled off and the residue fractionated in vacuo. The 1-(p-methoxyphenyl)-2-(methyl-diethyl-amino-ethyl))-aminoethane-1-ol boils at about 180° C. under a pressure of 3 mm. The dihydrochloride is a strongly hygroscopic crystalline mass.

EXAMPLE 5

*Racemic-1-phenyl-2-(diethylaminoethyl)-aminopropane-1-ol*

187 grams of racemic-1-phenyl-2-aminopropane-1-ol hydrochloride, 307 grams of diethylaminoethyl-p-toluene sulphonate hydrochloride, 1000 grams of benzene and a solution of 168 grams of potassium hydroxide in 1 litre of water are heated for several hours in a reflux apparatus, with active stirring. The benzene layer is then removed, the benzene being distilled off under reduced pressure and the residue subjected to vacuum distillation. The racemic-1-phenyl-2-(diethylaminoethyl)-aminopropane-1-ol boils at about 140° C. under a pressure of about 0.5 to 1 mm. The dihydroiodide crystallizes well and melts at 176 to 178° C.

EXAMPLE 6

*Racemic-1-phenyl-2-methyl-(diethylaminoethyl)-aminopropane-1-ol*

20 grams of racemic-1-phenyl-2-methylaminopropane-1-ol hydrochloride and 32.5 grams of diethylaminoethyl-p-toluene-sulphonate hydrochloride are dissolved in water, suffused with benzene and the whole is heated in a reflux condenser. During the heating, a solution of 16.8 grams of potassium hydroxide in 50 grams of water is introduced by drops. After heating for another hour, the benzene layer is separated, the benzene is distilled off and the residue is subjected to vacuum distillation. The racemic-1-phenyl-2-methyl-(diethylaminoethyl)-aminopropane-1-ol boils at 132–133° C. under a pressure of about 1 mm. The dihydrochloride is a snow-white, hygroscopic crystalline mass.

What I claim and desire to secure by Letters Patent of the United States is:

1. A chemical compound consisting of diamino-alcohols of the aromatic series of the type:

$$R_1-CH(OH)-CH-R_2$$
$$\phantom{R_1-CH(OH)-C}|$$
$$\phantom{R_1-CH(OH)-C}N-R_3$$
$$\phantom{R_1-CH(OH)-C}|$$
$$\phantom{R_1-CH(OH)-C}R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl.

2. The chemical compound phenyl-[(methyl)-(diethylaminoethyl)]-aminopropanol of the formula $$C_6H_5 \cdot CH(OH) \cdot CH \cdot CH_3$$
$$\phantom{C_6H_5 \cdot CH(OH) \cdot }|$$
$$\phantom{C_6H_5 \cdot CH(OH) \cdot }N-CH_3$$
$$\phantom{C_6H_5 \cdot CH(OH) \cdot }|$$
$$\phantom{C_6H_5 \cdot CH(OH) \cdot }CH_2 \cdot CH_2 \cdot N(C_2H_5)_2$$

3. The chemical compound phenyl-[(diethylaminoethyl)]-aminopropanol of the formula $$C_6H_5 \cdot CH(OH) \cdot CH \cdot CH_3$$
$$\phantom{C_6H_5 \cdot CH(OH) \cdot }|$$
$$\phantom{C_6H_5 \cdot CH(OH) \cdot }N-H$$
$$\phantom{C_6H_5 \cdot CH(OH) \cdot }|$$
$$\phantom{C_6H_5 \cdot CH(OH) \cdot }CH_2 \cdot CH_2 \cdot N(C_2H_5)_2$$

4. A process for the production of diamino-alcohols of the aromatic series of the type:

$$R_1-CH(OH)-CH-R_2$$
$$\phantom{R_1-CH(OH)-C}|$$
$$\phantom{R_1-CH(OH)-C}N-R_3$$
$$\phantom{R_1-CH(OH)-C}|$$
$$\phantom{R_1-CH(OH)-C}R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing non-oxidizing inorganic acid esters of dialkylaminoethylalcohols to react upon aminoalcohols of the aromatic series of the type:

$$R_1-CH(OH)-CH-R_2$$
$$\phantom{R_1-CH(OH)-C}|$$
$$\phantom{R_1-CH(OH)-C}N-H$$
$$\phantom{R_1-CH(OH)-C}|$$
$$\phantom{R_1-CH(OH)-C}R_4$$

in which $R_1$, $R_2$ and $R_4$ have the same significance as indicated.

5. A process for the production of diamino-alcohols of the aromatic series of the type:

$$R_1-CH(OH)-CH-R_2$$
$$\phantom{R_1-CH(OH)-C}|$$
$$\phantom{R_1-CH(OH)-C}N-R_3$$
$$\phantom{R_1-CH(OH)-C}|$$
$$\phantom{R_1-CH(OH)-C}R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl which comprises causing non-oxidizing inorganic acid esters of dialkylaminoethylalcohols to react upon 1-phenyl-2-methyl-aminopropane-1-ol (Ephedrin).

6. A process for the production of diamino-alcohols of the aromatic series of the type:

$$R_1-CH(OH)-CH-R_2$$
$$\phantom{R_1-CH(OH)-C}|$$
$$\phantom{R_1-CH(OH)-C}N-R_3$$
$$\phantom{R_1-CH(OH)-C}|$$
$$\phantom{R_1-CH(OH)-C}R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing halogen hydracid esters of dialkylaminoethylalcohols to react upon aminoalcohols of the aromatic series of the type:

$$R_1-CH(OH)-CH-R_2$$
$$\phantom{R_1-CH(OH)-C}|$$
$$\phantom{R_1-CH(OH)-C}N-H$$
$$\phantom{R_1-CH(OH)-C}|$$
$$\phantom{R_1-CH(OH)-C}R_4$$

in which $R_1$, $R_2$ and $R_4$ have the same significance as indicated.

7. A process for the production of diamino-alcohols of the aromatic series of the type:

$$R_1-CH(OH)-CH-R_2$$
$$\phantom{R_1-CH(OH)-C}|$$
$$\phantom{R_1-CH(OH)-C}N-R_3$$
$$\phantom{R_1-CH(OH)-C}|$$
$$\phantom{R_1-CH(OH)-C}R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing hydrogen halide addition salts of non-oxidizing inorganic acid esters of dialkylaminoethylalcohols to react upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

8. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing hydrogen halide addition salts of halogen hydracid esters of dialkylaminoethylalcohols to react upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

9. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing non-oxidizing inorganic acid esters of dialkylaminoethylalcohols to react in the presence of acid-combining agents upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

10. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing hydrogen halide addition salts of non-oxidizing inorganic acid esters of dialkylaminoethylalcohols to react in the presence of acid-combining agents upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

11. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing hydrogen halide addition salts of non-oxidizing inorganic acid esters of dialkylaminoethylalcohols to react in the presence of acid-combining agents upon hydrogen halide addition salts of aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

12. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing a phenyl sulphonic acid ester of dialkylaminoethylalcohols to react upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

13. A process for the production of diaminoalcohols of the aromatic series of the type:

$$R_1-CH(OH)-CH-R_2$$
$$|$$
$$N-R_3$$
$$|$$
$$R_4$$

in which $R_1$ denotes one of the group consisting of phenyl and para methoxy phenyl, $R_2$ denotes one of the group consisting of hydrogen and methyl, $R_3$ denotes dialkylaminoethyl, and $R_4$ denotes one of the group consisting of hydrogen and methyl, which comprises causing hydrogen halide addition salts of phenyl sulphonic acid ester of dialkylaminoethylalcohols to react upon aminoalcohols of the aromatic series of the type:

$$R_1-CH(OH)-CH-R_2$$
$$|$$
$$N-H$$
$$|$$
$$R_4$$

in which $R_1$, $R_2$ and $R_4$ have the same significance as indicated.

GUSTAV HEILNER.